Sept. 26, 1933.  B. H. LANTZ  1,927,873
NONLEAF HOLDING RAKE
Filed July 30, 1932
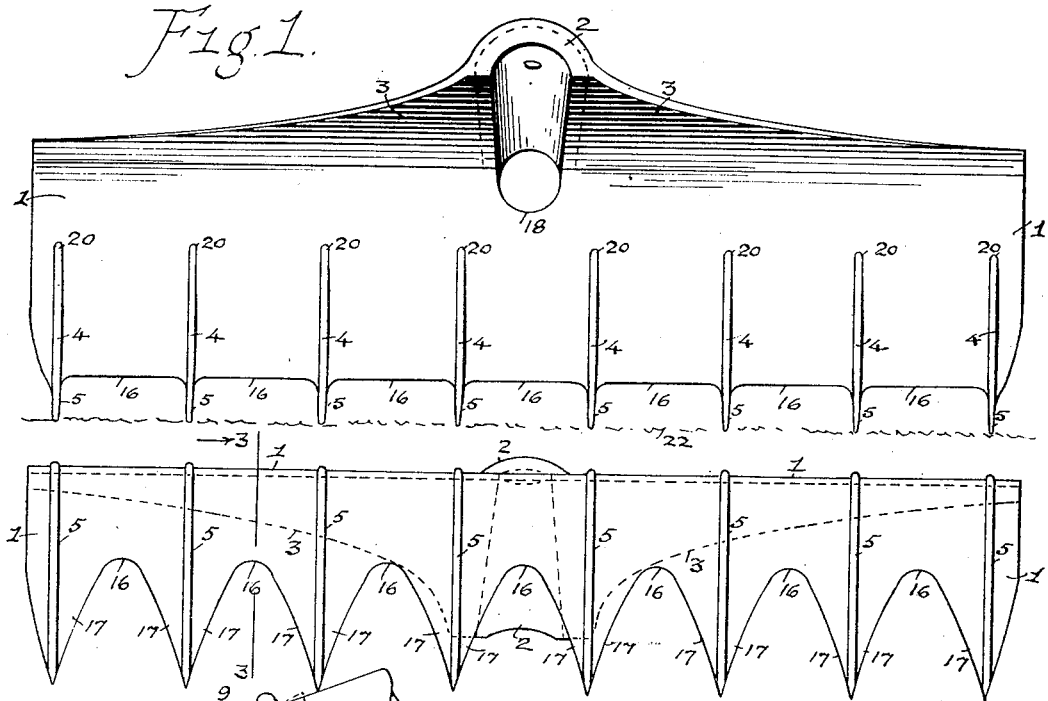
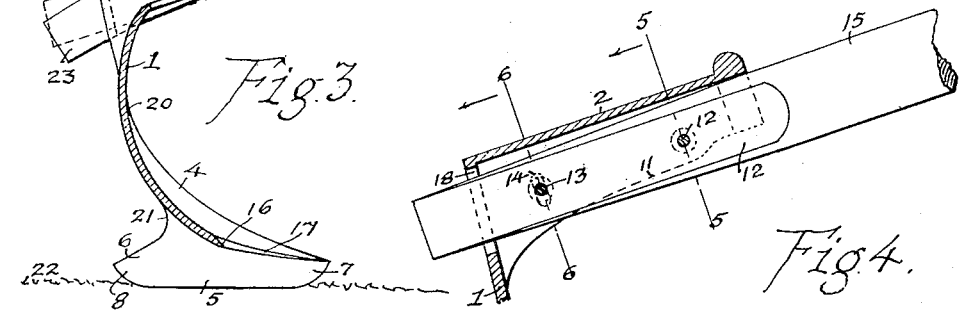
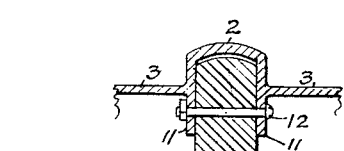
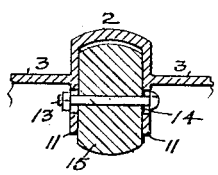
Inventor
Brice H. Lantz
By
Attorney Patented Sept. 26, 1933

1,927,873

UNITED STATES PATENT OFFICE 1,927,873

NONLEAF HOLDING RAKE

Brice H. Lantz, Porter Township, Porter County, Ind.

Application July 30, 1932. Serial No. 626,761

5 Claims. (Cl. 55—10)

My invention relates to improvements in nonleaf holding rakes and it more especially consists of the features pointed out in the claims.

The purpose of my invention is to provide a rake to which leaves will not adhere; that may be made of a single piece aluminum casting; that has pointed teeth that curve upwardly and forwardly in front of the curved rake body and extend rearwardly beneath the body forming short teeth on its rear surface; that may be used in a forward or rearward direction; and that may have a reversible or an adjustable handle.

With these and other ends in view I illustrate on the accompanying drawing such instances of adaptation as will show the broad underlying features of the invention without limiting myself to the specific details shown thereon and described herein.

Figure 1 is a front elevation with the handle removed.

Fig. 2 is a bottom plan view.

Fig. 3 is an end elevation partly in section.

Fig. 4 is an enlarged side elevation in section of a modified handle attachment.

Fig. 5 is a detached elevation in section on line 5—5 of Fig. 4.

Fig. 6 is a detached elevation in section on line 6—6 of Fig. 4.

In producing my rake for distribution I may use whatever alternatives or equivalents of construction that the exigencies of varying conditions may demand without departing from the broad spirit of the invention.

The rake is formed of a continuous body 1 from end to end. It is curved upward and slightly forward along its upper edge and at this edge reinforcing webs 3 are formed. These webs join the half ferrule 2 for the reception of a handle 10. The body 1 also curves forward and it terminates a short distance above the ground level 22. It ends at 16 so as to form a clearance space above the ground level through which the grass can pass. Instead of having isolated teeth as is usual in conventional types of rakes the front ribs 4 spaced apart lengthwise of the body in their spacing simulate ordinary rake teeth but they are formed as curved ribs integral with the body. These teeth are curved at a longer radius than the body itself as shown in Fig. 3. They merge into the body at 20 and at the front end they are pointed a little distance above the ground level.

Ribs or shoes 5 are formed on the underside of the body, transversely thereof, as shown in Figs. 2 and 3, as a continuation of ribs 4. Between these shoes webs 17 are formed on each side so as to join the body at 16. The shoes 5 extend rearwardly and upwardly at 6 beyond the body to which they are joined at 21. In order that the rake may be used forward and backward the shoes 5 at the front end are curved upward at 7 and are similarly curved at the rear end at 8.

There is a cooperative relation between the straight portion of the shoes 5 and the angle of the attached handle so that this straight portion will be approximately parallel with the ground level 22. The rake 10 may be adapted to the varying height of the users between two limits—an upper and a lower—as shown in Fig. 3. As instanced in that figure, the handle 10 with a curved and tapered end 23 is shown. It is held by a bolt 9 and as shown in full lines the handle is adapted to a short person, when turned upside down as shown in dotted lines it is adapted to a taller person.

In order that the rake handle may be adjusted to any point between an extreme upward or an extreme downward position the expedient shown in Figs. 4, 5 and 6 may be used. It consists of a handle 15, flattened at 19 on the sides of its tapered end. This flattened portion is positioned between two flanges 11 which depend from the webs 3. A horizontal bolt 12 serves as a pivot or fulcrum for the handle and a clamping bolt 13 movable in slots 14 of the flanges 11 serves to hold the handle in the desired position. An opening 18 is formed in the body 1 through which the small ends of the handles 15 may freely project but when handles 10 are used the small ends may be positioned tightly in such opening.

The leaves which are gathered in front of the rake roll upward without adhering to the body because the projecting ribs 4 prevent this, and small leaves will not pass through beneath the body, but the grass can freely pass between the shoes 5 and beneath the edge 16.

What I claim is:

1. In hand rakes, a continuous thin body curving downwardly in a forward direction and upward in a rearward direction, a plurality of curved ribbed teeth on the front side of the body extending upward onto it, a similar number of short teeth extending rearward, a plurality of shoes beneath the body joining the front and rear teeth spaced apart to form an opening therebetween beneath the body, and means for attaching a handle at the upper edge of the body.

2. A hand rake comprising a plurality of curved front teeth of long radius, a continuous body on which the teeth are integrally positioned said body being curved at a shorter radius than the teeth, short shallow rear teeth in line with the front teeth, a shoe connecting each pair of front and rear teeth projecting from beneath the body said shoes being upwardly curved at the front and back.

3. A non-leaf holding rake comprising a plurality of long curved front teeth, a plurality of short rear teeth, a shoe joining the lower extremities of a pair of front and rear teeth, a continuous one-piece thin curved body integral with all the teeth and means for securing a handle to the body above the teeth in an adjustable manner.

4. As a new article of manufacture a hand rake adapted to be used in a forward and a reverse direction, comprising a plurality of ground engaging shoes of material length, a long continuous body integrally joining the shoes with its lower edge spaced a slight distance above the lower edge of the shoes, teeth-like long ribs projecting upward and rearward from the shoes integrally attached to the front surface of the body, and short teeth-like ribs projecting upward and forward from the shoes onto the body, and means for attaching a handle to the upper edge of the body at a related angle to the straight portion of the shoes.

5. A rake comprising a continuous curved thin body, a plurality of curved teeth on its front, a similar number of curved teeth on its rear, and a handle adjustably attached to the body at its upper edge.

BRICE H. LANTZ.